(12) United States Patent
Luo

(10) Patent No.: US 12,088,119 B2
(45) Date of Patent: Sep. 10, 2024

(54) FOREIGN OBJECT DETECTION APPARATUS AND METHOD FOR WIRELESS POWER TRANSFER SYSTEM

(71) Applicant: NuVolta Technologies (Hefei) Co., Ltd., Hefei (CN)

(72) Inventor: Zhijun Luo, Shanghai (CN)

(73) Assignee: NuVolta Technologies (Heifei) Co., Ltd., Hefei (CN)

( * ) Notice: Subject to any disclaimer, the term of this patent is extended or adjusted under 35 U.S.C. 154(b) by 525 days.

(21) Appl. No.: 17/340,270

(22) Filed: Jun. 7, 2021

(65) Prior Publication Data

US 2022/0385113 A1    Dec. 1, 2022

(30) Foreign Application Priority Data

May 28, 2021  (CN) .......................... 202110598170.4

(51) Int. Cl.
 *H02J 50/60* (2016.01)
 *H02J 50/12* (2016.01)

(52) U.S. Cl.
 CPC .............. *H02J 50/60* (2016.02); *H02J 50/12* (2016.02)

(58) Field of Classification Search
 CPC ................................. H02J 50/60; H02J 50/12
 See application file for complete search history.

(56) References Cited

U.S. PATENT DOCUMENTS

| 2005/0125192 A1* | 6/2005 | Christensen | G01V 3/101 |
| | | | 702/150 |
| 2014/0008974 A1* | 1/2014 | Miyamoto | H02J 50/60 |
| | | | 307/104 |
| 2014/0225439 A1* | 8/2014 | Mao | H02J 50/12 |
| | | | 307/31 |
| 2014/0320230 A1* | 10/2014 | Jooyaie | H01F 27/2804 |
| | | | 333/25 |
| 2015/0102685 A1* | 4/2015 | Blood | H02J 50/402 |
| | | | 307/104 |
| 2015/0331135 A1* | 11/2015 | Widmer | G01V 3/101 |
| | | | 324/234 |
| 2019/0027971 A1* | 1/2019 | Tsai | H02J 50/05 |
| 2020/0185974 A1* | 6/2020 | Chen | H02J 50/12 |

(Continued)

FOREIGN PATENT DOCUMENTS

| CN | 110168860 A | 8/2019 |
| CN | 111211598 A | 5/2020 |

*Primary Examiner* — Daniel Kessie
*Assistant Examiner* — Brian K Baxter
(74) *Attorney, Agent, or Firm* — AP3 Law Firm PLLC

(57) ABSTRACT

A method includes wirelessly transferring power through a main coil of a wireless power transfer system, wherein the main coil is connected in series with a main resonant capacitor, and the main coil and the main resonant capacitor form a main resonant tank having a first resonant frequency, applying an excitation including a voltage step to an auxiliary resonant tank comprising an auxiliary coil and an auxiliary resonant capacitor, wherein the auxiliary resonant tank has a second resonant frequency different from the first resonant frequency, calculating a quality factor of the wireless power transfer system based on a plurality of parameters derived from a damped sinusoidal waveform obtained from the auxiliary resonant tank, and determining whether a foreign object is magnetically coupled to the wireless power transfer system based on the quality factor.

17 Claims, 7 Drawing Sheets

(56) References Cited

U.S. PATENT DOCUMENTS

| | | | | |
|---|---|---|---|---|
| 2020/0381960 | A1* | 12/2020 | Goodchild | H02J 50/402 |
| 2021/0234411 | A1* | 7/2021 | Cai | H02J 50/12 |
| 2021/0351625 | A1* | 11/2021 | Chen | H02M 3/33592 |
| 2022/0255354 | A1* | 8/2022 | Luo | H02J 50/12 |
| 2022/0393515 | A1* | 12/2022 | Li | H02J 50/70 |
| 2023/0104039 | A1* | 4/2023 | Hiramatsu | H02J 50/60 |
| | | | | 307/104 |
| 2023/0417945 | A1* | 12/2023 | Wang | B60L 53/124 |

* cited by examiner

FOREIGN OBJECT DETECTION APPARATUS AND METHOD FOR WIRELESS POWER TRANSFER SYSTEM

PRIORITY CLAIM

This application claims priority to Chinese Patent Application No. 2021105981704, filed on May 28, 2021, which is hereby incorporated by reference in its entirety.

TECHNICAL FIELD

The present invention relates to a foreign object detection apparatus and method, and, in particular embodiments, to a foreign object detection apparatus for a wireless power transfer system.

BACKGROUND

As technologies further advance, wireless power transfer has emerged as an efficient and convenient mechanism for powering or charging battery based mobile devices such as mobile phones, tablet PCs, digital cameras, MP3 players and/or the like. A wireless power transfer system typically comprises a primary side transmitter and a secondary side receiver. The primary side transmitter is magnetically coupled to the secondary side receiver through a magnetic coupling. The magnetic coupling may be implemented as a loosely coupled transformer having a primary side coil formed in the primary side transmitter and a secondary side coil formed in the secondary side receiver.

The primary side transmitter may comprise a power conversion unit such as a primary side of a power converter. The power conversion unit is coupled to a power source and is capable of converting electrical power to wireless power signals. The secondary side receiver is able to receive the wireless power signals through the loosely coupled transformer and convert the received wireless power signals to electrical power suitable for a load.

In a wireless power transfer system, energy transferring is intended to occur between the primary side transmitter and the secondary side receiver. Foreign objects placed between or adjacent to the primary side transmitter and the secondary side receiver may cause unnecessary power dissipation, thereby reducing the power transfer efficiency in the wireless power transfer system. As power transfer efficiency has become more important, it would be desirable to have a simple and reliable foreign object detection apparatus and method to provide a fast and accurate solution under a variety of operating conditions.

SUMMARY

These and other problems are generally solved or circumvented, and technical advantages are generally achieved, by preferred embodiments of the present disclosure which provide a foreign object detection apparatus for a wireless power transfer system.

In accordance with an embodiment, a method comprises wirelessly transferring power through a main coil of a wireless power transfer system, wherein the main coil is connected in series with a main resonant capacitor, and the main coil and the main resonant capacitor form a main resonant tank having a first resonant frequency, applying an excitation including a voltage step to an auxiliary resonant tank comprising an auxiliary coil and an auxiliary resonant capacitor, wherein the auxiliary resonant tank has a second resonant frequency different from the first resonant frequency, calculating a quality factor of the wireless power transfer system based on a plurality of parameters derived from a damped sinusoidal waveform obtained from the auxiliary resonant tank, and determining whether a foreign object is magnetically coupled to the wireless power transfer system based on the quality factor.

In accordance with another embodiment, a method comprises wirelessly transferring power through a main coil in a wireless power transfer system, wherein the main coil is connected in series with a main resonant capacitor, and the main coil and the main resonant capacitor form a main resonant tank having a first resonant frequency, during a process of wirelessly transferring power through the main coil, calculating a power loss in the wireless power transfer system, during the process of wirelessly transferring power through the main coil, applying an excitation including a voltage step to an auxiliary resonant tank comprising an auxiliary coil and an auxiliary resonant capacitor, wherein the auxiliary resonant tank has a second resonant frequency different from the first resonant frequency, calculating a quality factor of the wireless power transfer system based on a plurality of parameters derived from a damped sinusoidal waveform obtained from the auxiliary resonant tank, and determining whether a foreign object is magnetically coupled to the wireless power transfer system based on the quality factor and the power loss.

In accordance with yet another embodiment, an apparatus comprises a power conversion device coupled to a main resonant tank of a wireless power transfer system, wherein the main resonant tank comprises a main resonant capacitor and a main coil connected in series, an excitation injection circuit coupled to an auxiliary resonant tank of the wireless power transfer system, wherein the auxiliary resonant tank comprises an auxiliary resonant capacitor and an auxiliary coil connected in series, and a controller configured to determine whether a foreign object is magnetically coupled to the wireless power transfer system based on a quality factor and a power loss of the wireless power transfer system.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a foreign object detection apparatus for a wireless power transfer system. The invention may also be applied, however, to a variety of power systems. Hereinafter, various embodiments will be explained in detail with reference to the accompanying drawings.

Figure 1:
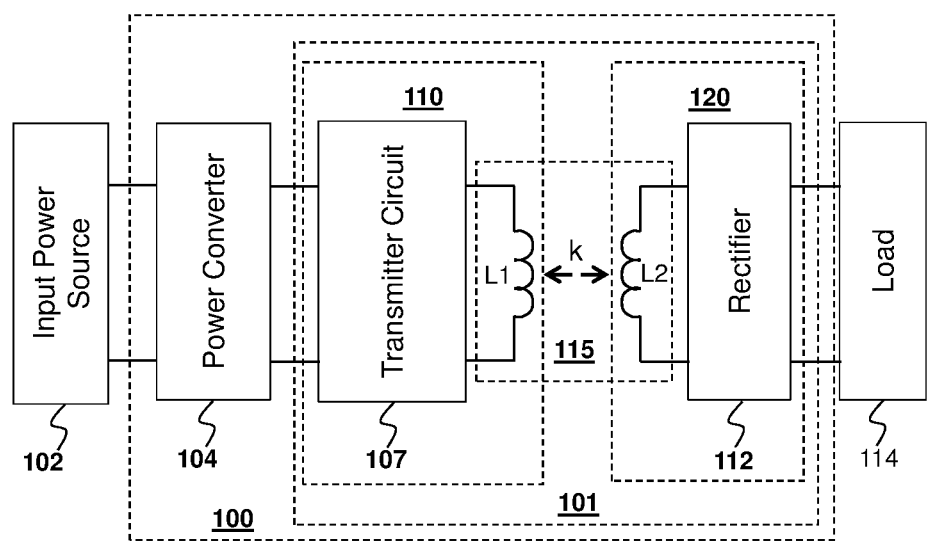
FIG. 1 illustrates a block diagram of a wireless power transfer system in accordance with various embodiments of the present disclosure.

FIG. 1 illustrates a block diagram of a wireless power transfer system in accordance with various embodiments of the present disclosure. The wireless power transfer system 100 comprises a power converter 104 and a wireless power transfer device 101 connected in cascade between an input power source 102 and a load 114. The wireless power transfer device 101 includes a transmitter 110 and a receiver 120. As shown in FIG. 1, the transmitter 110 comprises a transmitter circuit 107 and a transmitter coil L1 connected in cascade. The input of the transmitter circuit 107 is coupled to an output of the power converter 104. The receiver 120 comprises a receiver coil L2 and a rectifier 112 connected in cascade. The output of the rectifier 112 is coupled to the load 114.

The transmitter 110 is magnetically coupled to the receiver 120 through a magnetic field when the receiver 120 is placed near the transmitter 110. A loosely coupled transformer 115 is formed by the transmitter coil L1, which is part of the transmitter 110, and the receiver coil L2, which is part of the receiver 120. As a result, power may be transferred from the transmitter 110 to the receiver 120.

In some embodiments, the transmitter 110 may be inside a charging pad. The transmitter coil is placed underneath the top surface of the charging pad. The receiver 120 may be embedded in a mobile phone. When the mobile phone is place near the charging pad, a magnetic coupling may be established between the transmitter coil and the receiver coil. In other words, the transmitter coil and the receiver coil may form a loosely coupled transformer through which a power transfer occurs between the transmitter 110 and the receiver 120. The strength of coupling between the transmitter coil L1 and the receiver coil L2 is quantified by the coupling coefficient k. In some embodiments, k is in a range from about 0.05 to about 0.9.

In some embodiments, after the magnetic coupling has been established between the transmitter coil L1 and the receiver coil L2, the transmitter 110 and the receiver 120 may form a power system through which power is wirelessly transferred from the input power source 102 to the load 114.

The input power source 102 may be a power adapter converting a utility line voltage to a direct-current (dc) voltage. Alternatively, the input power source 102 may be a renewable power source such as a solar panel array. Furthermore, the input power source 102 may be an energy storage device such as rechargeable batteries, fuel cells and/or the like.

The load 114 represents the power consumed by the mobile device (e.g., a mobile phone) coupled to the receiver 120. Alternatively, the load 114 may refer to a rechargeable battery and/or batteries connected in series/parallel, and coupled to the output of the receiver 120.

The transmitter circuit 107 may comprise primary side switches of a full-bridge power converter according to some embodiments. The full-bridge is also known as an H-bridge. Alternatively, the transmitter circuit 107 may comprise the primary side switches of other converters such as a half-bridge converter, a push-pull converter and the like. The detailed configuration of the transmitter circuit 107 will be described below with respect to FIG. 2.

It should be noted that the converters described above are merely examples. One having ordinary skill in the art will recognize other suitable power converters such as class E topology based power converters (e.g., a class E amplifier), may alternatively be used.

The transmitter circuit 107 may further comprise a resonant capacitor. The resonant capacitor and the magnetic inductance of the transmitter coil may form a resonant tank. Depending on design needs and different applications, the resonant tank may further include a resonant inductor. In some embodiments, the resonant inductor may be implemented as an external inductor. In alternative embodiments, the resonant inductor may be implemented as a connection wire.

The receiver 120 comprises the receiver coil L2 magnetically coupled to the transmitter coil L1 after the receiver 120 is placed near the transmitter 110. As a result, power may be transferred to the receiver coil and further delivered to the load 114 through the rectifier 112. The receiver 120 may comprise a secondary resonant capacitor.

The rectifier 112 converts an alternating polarity waveform received from the output of the receiver coil L2 to a single polarity waveform. In some embodiments, the rectifier 112 is implemented as a synchronous rectifier including four switches. In alternative embodiments, the rectifier 112 comprises a full-wave diode bridge and an output capacitor.

Furthermore, the synchronous rectifier may be formed by any controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like.

The detailed structure of the rectifier 112 will be discussed below with respect to FIG. 2.

The power converter 104 is coupled between the input power source 102 and the input of the wireless power transfer device 101. Depending design needs and different applications, the power converter 104 may comprise many different configurations. In some embodiments, the power converter 104 may be a non-isolated power converter such as a buck converter. In some embodiments, the power converter 104 may be implemented as a linear regulator. In some embodiments, the power converter 104 may be an isolated power converter such as a forward converter.

The implementation of the power converter 104 described above is merely an example, which should not unduly limit the scope of the claims. One of ordinary skill in the art would recognize many variations, alternatives, and modifications. Furthermore, depending on different applications and design needs, the power converter 104 may be an optional element of the wireless power transfer system 100. In other words, the input power source 102 may be connected to the transmitter circuit 107 directly.

In operation, a quality factor of the wireless power transfer system 100 may be used to determine whether a foreign object is magnetically coupled to the wireless power transfer system 100. The quality factor may be calculated during the process of wirelessly transferring power between the transmitter and the receiver of the wireless power transfer system 100. In order to calculate the quality factor during the process of wirelessly transferring power, an auxiliary coil is employed to generate a plurality of operating parameters for calculating the quality factor. The detailed structure and operating principle of the auxiliary coil will be discussed below with respect to FIGS. 2-5.

Figure 2:
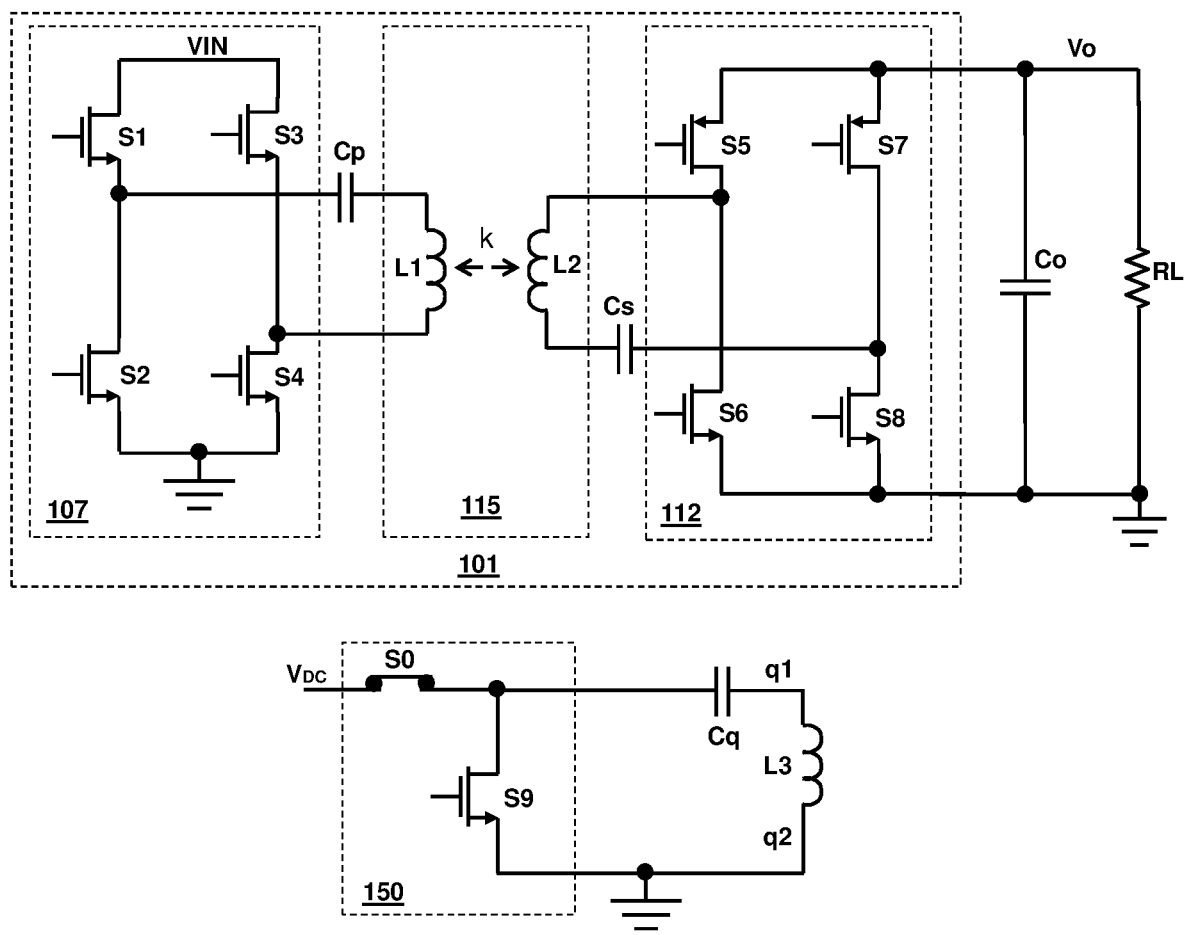
FIG. 2 illustrates a schematic diagram of the wireless power transfer system shown in FIG. 1 in accordance with various embodiments of the present disclosure.

FIG. 2 illustrates a schematic diagram of the wireless power transfer system shown in FIG. 1 in accordance with various embodiments of the present disclosure. The wireless power transfer device 101 comprises a transmitter circuit 107, a resonant capacitor Cp, a loosely coupled transformer 115, a resonant capacitor Cs and a rectifier 112 connected in cascade. The loosely coupled transformer 115 is formed by the transmitter coil L1 and the receiver coil L2. The transmitter circuit 107 is implemented as a full-bridge as shown in FIG. 2. Throughout the description, the transmitter circuit 107 may be alternatively referred to as a full-bridge or a power conversion device.

The full-bridge 107 includes four switching elements, namely S1, S2, S3 and S4. As shown in FIG. 2, the switching elements S1 and S2 are connected in series between an input voltage bus VIN and ground. The input voltage bus VIN is connected to the output of the power converter 104 shown in FIG. 1. Likewise, the switching elements S3 and S4 are connected in series between the input voltage bus VIN and ground. The common node of the switching elements S1 and S2 is coupled to a first input terminal of the transmitter coil L1 through the resonant capacitor Cp. The common node of the switching elements S3 and S4 is coupled to a second input terminal of the transmitter coil L1.

According to some embodiments, the switching elements S1, S2, S3 and S4 are implemented as MOSFET or MOSFETs connected in parallel, any combinations thereof and/or the like. According to alternative embodiments, the switching elements (e.g., switch S1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a full-bridge converter (e.g., full-bridge 107 shown in FIG. 2), the implementation of the transmitter circuit 107 shown in FIG. 2 may have many variations, alternatives, and modifications. For example, half-bridge converters, push-pull converters, class E based power converters (e.g., a class E amplifier) may be alternatively employed. Furthermore, an inductor-inductor-capacitor (LLC) resonant converter may be formed when the transmitter coil L1 is tightly coupled with the receiver coil L2 in some applications.

In sum, the full-bridge 107 illustrated herein is limited solely for the purpose of clearly illustrating the inventive aspects of the various embodiments. The present invention is not limited to any particular power topology.

It should further be noted that while FIG. 2 illustrates four switches S1-S4, various embodiments of the present disclosure may include other variations, modifications and alternatives. For example, a separate capacitor may be connected in parallel with each switch of the full-bridge 107. Such a separate capacitor helps to better control the timing of the resonant process of the full-bridge 107.

The outputs of the receiver coil L2 are coupled to the load RL through the resonant capacitor Cs, the rectifier 112 and a capacitor Co. The rectifier converts an alternating polarity waveform received from the outputs of the receiver coil L2 to a single polarity waveform. The capacitor Co is employed to attenuate noise and provide a steady output voltage. The resonant capacitor Cs helps to achieve soft switching for the wireless power transfer system.

In some embodiments, the rectifier 112 is implemented as a synchronous rectifier. The rectifier 112 includes four switching elements, namely S5, S6, S7 and S8. As shown in FIG. 2, the switching elements S5 and S6 are connected in series between the output terminal of the rectifier 112 and ground. Likewise, the switching elements S7 and S8 are connected in series between the output terminal of the rectifier 112 and ground. As shown in FIG. 2, the common node of the switching elements S5 and S6 is coupled to a first terminal of the receiver coil L2. The common node of the switching elements S7 and S8 is coupled to a second terminal of the receiver coil L2 through the resonant capacitor Cs.

According to some embodiments, the switching elements S5, S6, S7 and S8 are implemented as MOSFET or MOSFETs connected in parallel, any combinations thereof and/or the like.

Figure 3:
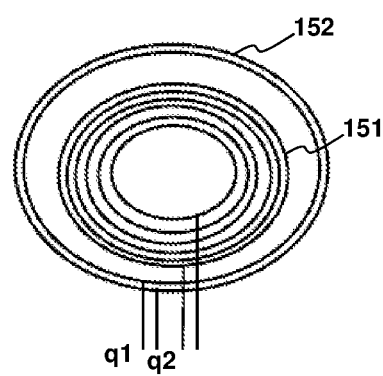
FIG. 3 illustrates an arrangement of the main coil and the auxiliary coil shown in FIG. 2 in accordance with various embodiments of the present disclosure.

In order to calculate the quality factor of the wireless power transfer system, one additional coil L3 is employed in the wireless power transfer system. Throughout the description, L3 may be alternatively referred to as an auxiliary coil. In some embodiments, the auxiliary coil L3 and the transmitter coil L1 are placed adjacent to each other (e.g., two coils adjacent to each other as shown in FIG. 3). Both the auxiliary coil L3 and the transmitter coil L1 are in the transmitter of the wireless power transfer system. In this configuration, the transmitter coil L1 may be alternatively referred to as a main coil. The resonant capacitor Cp may be alternatively referred to as a main resonant capacitor. In alternative embodiments, the auxiliary coil L3 and the receiver coil L2 are placed adjacent to each other (e.g., two coils adjacent to each other as shown in FIG. 3). Both the auxiliary coil L3 and the receiver coil L2 are in the receiver of the wireless power transfer system. In this configuration, the receiver coil L2 may be alternatively referred to as a main coil. The resonant capacitor Cs may be alternatively referred to as a main resonant capacitor.

As shown in FIG. 2, the auxiliary coil L3 and an auxiliary resonant capacitor Cq are connected in series. The auxiliary coil L3 and the auxiliary resonant capacitor Cq form an auxiliary resonant tank. The auxiliary resonant tank has a first resonant frequency. The main resonant tank (e.g., the main resonant tank formed by the resonant capacitor Cp and the transmitter coil L1) has a second resonant frequency. The full-bridge 107 is configured to operate at a switching frequency approximately equal to the second resonant frequency (the resonant frequency of the main resonant tank). In some embodiments, the first resonant frequency is in a range from about 500 KHz to about 1 MHz. The second resonant frequency is about 100 KHz. The switching frequency of the full-bridge 107 is about 100 KHz.

The auxiliary resonant tank is employed to obtain the quality factor of the wireless power transfer system during the process of transferring power between the transmitter and the receiver. As described above, the resonant frequency of the auxiliary tank is different from that of the resonant frequency of the main resonant tank. More particularly, the resonant frequency of the main resonant tank is at least five times greater than the resonant frequency of the auxiliary resonant tank. Such a resonant frequency difference helps to prevent the main magnetic coupling (the magnetic coupling between L1 and L2) from interfering with the operation of the auxiliary resonant tank.

During the process of calculating the quality factor, an excitation including a voltage step is applied to an auxiliary resonant tank. The excitation is generated by an excitation injection circuit 150 and a bias voltage source $V_{DC}$. The excitation injection circuit 150 comprises a first switch S0 and a second switch S9. The first switch S0 is connected between the bias voltage source $V_{DC}$ and a first input of the auxiliary resonant tank. The second switch S9 is connected between the first input and a second input of the auxiliary resonant tank. Throughout the description, the excitation injection circuit may be alternatively referred to as a switch network.

One skilled in the art will recognize that the excitation injection circuit shown in FIG. 2 is simply one manner of applying the excitation to the auxiliary resonant tank and that other and alternate embodiment excitation injection circuits could be employed (such as employing a different number of switches) and that other circuits (e.g., a full bridge) could be employed for this function.

FIG. 3 illustrates an arrangement of the main coil and the auxiliary coil shown in FIG. 2 in accordance with various embodiments of the present disclosure. In some embodiments, a main coil 151 and an auxiliary coil 152 are placed adjacent to each other. As shown in FIG. 3, the main coil 151 is surrounded by the auxiliary coil 152. Referring back to FIG. 2, the main coil 151 may be implemented as the transmitter coil L1. Alternatively, the main coil 151 may be implemented as the receiver coil L2. The auxiliary coil L3 has two terminals q1 and q2. As shown in FIG. 3, these two terminals q1 and q2 are placed next to each other.

One skilled in the art will recognize that coil arrangement shown in FIG. 3 is simply one embodiment and that other configurations for these two coils can be employed. For example, one coil may be stacked on top of the other coil. Furthermore, these two coils may be placed side by side.

Figure 4:
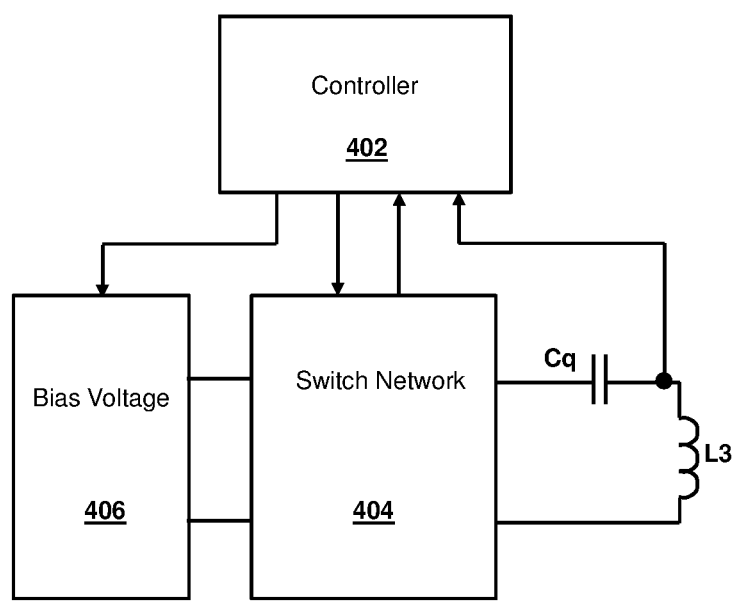
FIG. 4 illustrates an apparatus for applying an excitation to the auxiliary resonant tank of the wireless power transfer system shown in FIG. 1 in accordance with various embodiments of the present disclosure.

FIG. 4 illustrates an apparatus for applying an excitation to the auxiliary resonant tank of the wireless power transfer system shown in FIG. 1 in accordance with various embodiments of the present disclosure. The apparatus comprises a controller 402, a switch network 404, a bias voltage source 406, an auxiliary resonant capacitor Cq and an auxiliary coil L3. In some embodiments, the switch network 404 is implemented as the excitation injection circuit 150 shown in FIG. 2. The bias voltage source 406 is a dc power source configured to provide a dc voltage. The dc voltage is employed to generate an excitation applied to the auxiliary resonant tank formed by the auxiliary resonant capacitor Cq and the auxiliary coil L3.

As shown in FIG. 4, the switch network 404 is coupled to the auxiliary coil L3 through the auxiliary resonant capacitor Cq. The controller 402 is coupled to the switch network 404 and the bias voltage source 406. As shown in FIG. 4, the controller 402 is configured to receive various operating parameters from the switch network 404, and generate a plurality of operating commands to control the switch network 404 and the bias voltage source 406. Furthermore, the controller 402 is configured to detect the voltage across L3 and/or the current flowing through L3.

In operation, a foreign object (e.g., a coin) may be magnetically coupled to the wireless power transfer system. In order to operate the wireless power transfer system reliably, the controller 402 may configure the bias voltage source 406 and the switch network 404 such that an excitation (e.g., a voltage step) is applied to the auxiliary resonant tank formed by Cp and L3. Applying an excitation to the auxiliary resonant tank will be described in detail below with respect to FIG. 5.

In response to this excitation, a signal having a damped sinusoidal waveform is generated in the auxiliary resonant tank. The controller 402 detects this signal (e.g., detecting the voltage across L3). Based on the detected signal, an algorithm is employed to calculate the quality factor of the wireless power transfer system. The algorithm for calculating the quality factor will be described in detail below with respect to FIG. 6. Based on the quality factor, the controller 402 is able to determine whether a foreign object is magnetically coupled to the wireless power transfer system. Throughout the description, the apparatus shown in FIG. 4 may be alternatively referred to as a foreign object detection apparatus. In some embodiments, the foreign object detection apparatus may be part of a foreign object detection system. The foreign object detection system may further comprise the full-bridge 107.

It should be noted that detecting a foreign object based on the quality factor can be combined with other suitable foreign object detection methods such as detecting a foreign object based on the power loss increase in the wireless power transfer system. During the process of wirelessly transferring power between the transmitter and the receiver, the controller 402 is able to calculate the power loss through comparing the power received by the receiver and the power transmitted by the transmitter. The power loss is compared with a predetermined power loss threshold. After the power loss exceeds the predetermined power loss threshold, the controller 402 considers this as an increase of the power loss. Such an increase of the power loss indicates a foreign object is magnetically coupled to the wireless power transfer system. At the same time, the controller 402 is able to calculate the quality factor of the wireless power transfer system. A reduction of the value of the quality factor indicates a foreign object is magnetically coupled to the wireless power transfer system. For example, when a foreign object is magnetically coupled to the wireless power transfer system, the quality factor drops from a high quality factor value (e.g., from about 50 to about 60) to a low quality factor value (e.g., about 30). These two methods may be taken in combination to determine whether a foreign object is magnetically coupled to the wireless power transfer system. For example, after getting the quality factor and the power loss, the controller is able to determine whether a foreign object is magnetically coupled to the wireless power transfer system.

Figure 5:
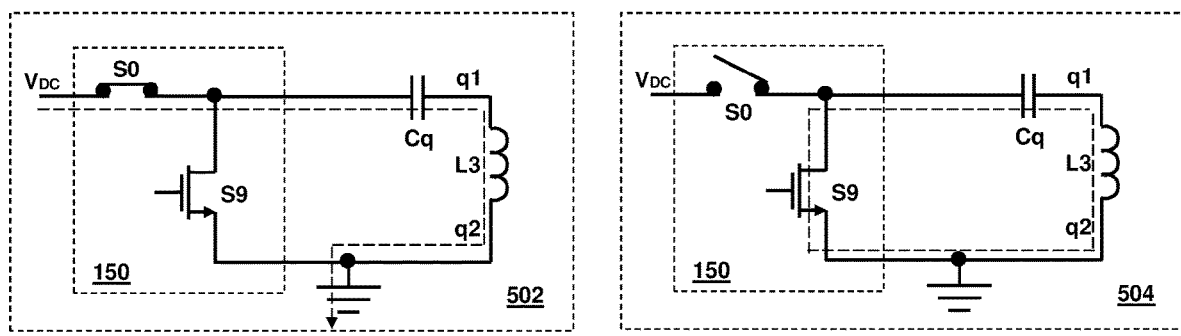
FIG. 5 illustrates a schematic diagram of the apparatus for applying the excitation to the auxiliary resonant tank of the wireless power transfer system in accordance with various embodiments of the present disclosure.

FIG. 5 illustrates a schematic diagram of the apparatus for applying the excitation to the auxiliary resonant tank of the wireless power transfer system in accordance with various embodiments of the present disclosure. The bias voltage source 406 shown in FIG. 4 is configured to generate a predetermined dc voltage $V_{Dc}$. The output of the bias voltage source 406 is connected to the auxiliary resonant tank through the switch network comprising S0 and S9.

The controller 402 (shown in FIG. 4) configures the bias voltage source 406 and the switch S0 such that an excitation is applied to the auxiliary resonant tank formed by Cq and L3. The excitation is applied to the auxiliary resonant tank through two steps. In a first step, as shown in a dashed rectangle 502, the switch S0 is turned on and the switch S9 is turned off. After the turn-on of the switch S0, $V_{DC}$ is applied to the auxiliary resonant tank. In response to $V_{Dc}$, a current flows from the bias voltage source 406 ($V_{Dc}$) to ground through S0, Cq and L3 as indicated by the dashed line. In a second step, as shown in a dashed rectangle 504, the switch S0 is turned off and the switch S9 is turned on. After the turn-off of the switch S0 and the turn-on of the switch S9, two terminals of the auxiliary resonant tank are shorted to ground. The current flows in a conductive loop formed by S9, Cq and L3 as indicated by the dashed line. By controlling the switch network (S0 and S9), a voltage step (from $V_{DC}$ to zero) is applied to the inputs of the auxiliary resonant thank. In response to this voltage step, a signal having a resonant attenuation envelope is generated in the auxiliary resonant tank. This signal can be used to calculate the quality factor of the wireless power transfer system. The signal having a resonant attenuation envelope will be discussed below with respect to FIG. 6.

Figure 6:
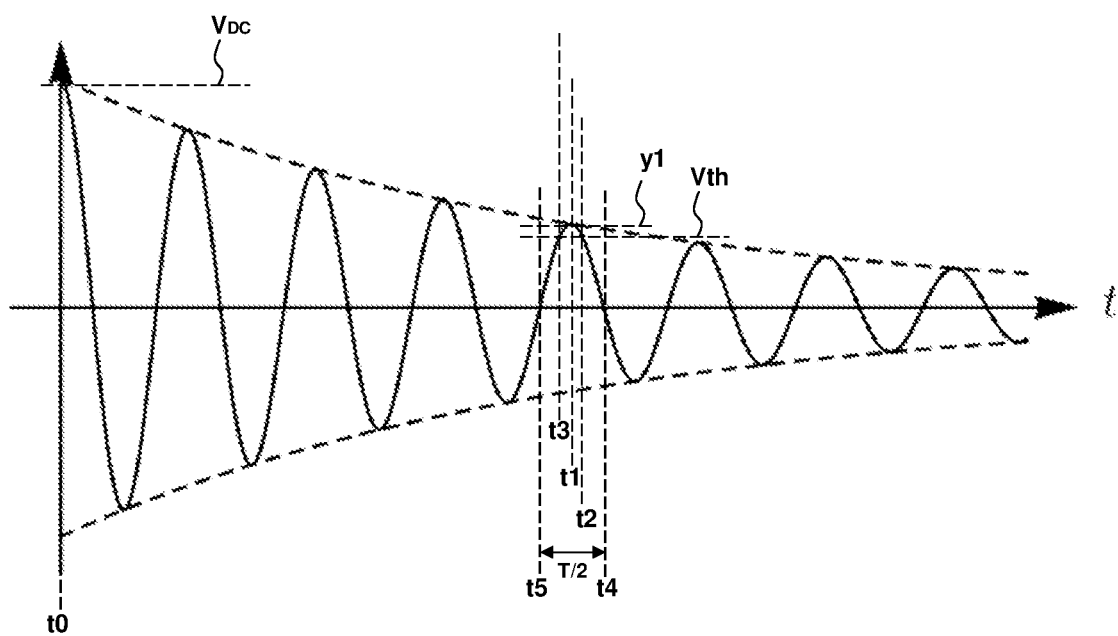
FIG. 6 illustrates a signal having a resonant attenuation envelope in accordance with various embodiments of the present disclosure.

FIG. 6 illustrates a signal having a resonant attenuation envelope in accordance with various embodiments of the present disclosure. After the excitation (e.g., a voltage step) is applied to the auxiliary resonant tank formed by the auxiliary coil L3 and the auxiliary resonant capacitor Cq, the voltage across the auxiliary coil L3 has a damped sinusoidal waveform. This damped sinusoidal waveform has a resonant attenuation envelope as shown in FIG. 6.

It should be noted that the voltage signal shown in FIG. 6 is merely an example, which should not unduly limit the scope of the claims. One skilled in the art will recognize that the voltage signal across the auxiliary coil is simply one manner of generating a damped sinusoidal waveform having a resonant attenuation envelope and that other and alternate embodiment methods could be employed. For example, the signal can be a current flowing through the auxiliary resonant tank. This current has a resonant attenuation envelope.

As shown in FIG. 6, t2 is a last time instant at which a value of the damped sinusoidal waveform is equal to a predetermined threshold voltage Vth. Through a suitable sensor, t2 can be measured. As shown in FIG. 6, t1 is a time instant corresponding to a peak value of the damped sinusoidal waveform. The peak value y1 is the closest peak value adjacent to t2. As shown in FIG. 6, t1 and t2 are in a same period of the damped sinusoidal waveform.

As shown in FIG. 6, the time instant t1 can be expressed as:

$$t1 = N \times T \quad (1)$$

In Equation (1), T is the period of the damped sinusoidal waveform. T can be measured through a suitable sensor. N is an integer. In the example illustrated in FIG. 6, N is equal to 4.

The peak value y1 can be expressed as:

$$Vth = y1 \times \sin\left(\frac{\frac{T}{4} - (t2 - t1)}{\frac{T}{4}} \times \frac{\pi}{2}\right) \quad (2)$$

In Equation (2), Vth is the predetermined threshold voltage. T is the period of the damped sinusoidal waveform. As shown in FIG. 6, the time between t4 and t5 is equal to one half of the period. The value of y1 can be obtained through solving Equation (2).

It should be noted that t2 and t3 are symmetrical with respect to t1. The difference of t2 and t1 (t2-t1) is equal to the difference of t1 and t3 (t1-t3).

According to the damped sinusoidal waveform, the peak value y1 can also be expressed as:

$$y1 = V_{DC} \times e^{-\frac{t1}{\tau}} \quad (3)$$

In Equation (3), $V_{DC}$ is the voltage level of the bias voltage source. τ is the time constant of the damped sinusoidal waveform. The time constant is used to indicate how rapidly an exponential function decays.

Equation (3) can be simplified as:

$$e^{\frac{t1}{\tau}} = V_{DC}/y1 \quad (4)$$

Equation (4) can be expressed as:

$$\frac{t1}{\tau} = \ln\left(\frac{V_{DC}}{y1}\right) \quad (5)$$

According to the definition of the time constant, τ can be expressed as:

$$\tau = \frac{2 \times L}{R} \quad (6)$$

In Equation (6), L is the equivalent inductance of the auxiliary resonant tank. R is the equivalent resistance of the auxiliary resonant tank. Equation (5) can be expressed as the following equation by substituting Equation (6) into Equation (5).

$$\frac{L}{R} = \frac{t1}{2 \times \ln\left(\frac{V_{DC}}{y1}\right)} \quad (7)$$

The quality factor of the auxiliary resonant tank can be expressed by the following equation:

$$Q = \frac{L}{R} \times 2\pi \times f \qquad (8)$$

In Equation (8), f is the frequency of the damped sinusoidal waveform. In some embodiments, the frequency of the damped sinusoidal waveform is equal to 100 KHz. The quality factor of the auxiliary resonant tank can be expressed by the following equation by substituting Equation (7) into Equation (8).

$$Q = \frac{t1}{2 \times \ln\left(\frac{V_{DC}}{y1}\right)} \times 2\pi \times f \qquad (9)$$

In Equation (9), t1 can be obtained from Equation (1). On the other hand, y1 can be obtained through solving Equation (2), and y1 is a peak value. $V_{Dc}$ is the voltage level of the bias voltage source. $V_{DC}$ functions as a voltage step of the excitation. Equation (9) indicates the quality factor can be calculated based on a ratio of the voltage step ($V_{Dc}$) to the peak value (y1). From Equation (9), the quality factor Q can be calculated accurately.

In operation, a foreign object may be magnetically coupled to the wireless power transfer system. The foreign object may have an impact on the values of L and R of Equation (8). More particularly, the foreign object may reduce the inductance of the coil and increase the equivalent series impedance. Such a change may result in a reduction of the quality factor of the wireless power transfer system. As such, the value of the quality factor Q can indicate whether a foreign object has been magnetically coupled to the wireless power transfer system.

A suitable device is configured to record a start point ($V_{Dc}$ and t0 shown in FIG. 6) of the signal having the damped sinusoidal waveform. The controller is configured to provide a predetermined threshold voltage (Vth). A suitable timing measurement sensor is configured to measure a resonant period (T) of the damped sinusoidal waveform. A sensor may be employed to measure the voltage across the coil of the resonant tank. The controller 402 receives the measured voltage. An algorithm is used to analyze the measured voltage (e.g., the voltage waveform shown in FIG. 6). The controller 402 is configured to record the last time instant (t2) at which the voltage of the damped sinusoidal waveform is equal to the predetermined threshold voltage Vth. As indicated by Equations (1) and (2), the algorithm is able to acquire the values of t1 and y1. The start point ($V_{Dc}$ and t0) has been recorded. After having t1, y1, t0 and $V_{Dc}$, the quality factor Q can be determined by solving Equation (9). Furthermore, based on the value of the quality factor Q, the algorithm can further determine whether a foreign object has been magnetically coupled to the wireless power transfer system.

It should be noted that the quality factor calculation method shown in FIG. 6 is merely an example. One of ordinary skill in the art would recognize many variations, alternatives, and modifications. For example, the quality factor may be calculated by applying an a sinusoidal signal to the auxiliary resonant tank, measuring a voltage across the auxiliary coil after the sinusoidal signal has been applied to the auxiliary coil, and calculating the qualify factor based on a ratio of the Root Mean Square (RMS) value of the voltage across the auxiliary coil to the RMS value of the sinusoidal signal. Throughout the description, the method described in this paragraph may be alternatively referred to as the RMS ratio method.

Furthermore, the quality factor may be calculated by applying an excitation including a voltage step to the auxiliary resonant tank, measuring a first voltage peak (Vpeak1) across the auxiliary coil and the corresponding first time instant (t1), measuring a second voltage peak (Vpeak2) across the auxiliary coil and the corresponding second time instant (t2), and calculating the qualify factor based on the following equation:

$$Q = \frac{t2 - t1}{2 \times \ln\left(\frac{V_{peak2}}{V_{peak1}}\right)} \times 2\pi \times f \qquad (10)$$

In Equation (10) above, f is the frequency of a timer clock in the wireless power transfer system. In some embodiments, the frequency of the timer clock is about 100 KHz. Throughout the description, the method shown in Equation (10) may be alternatively referred to as the peak value detection method.

Figure 7:
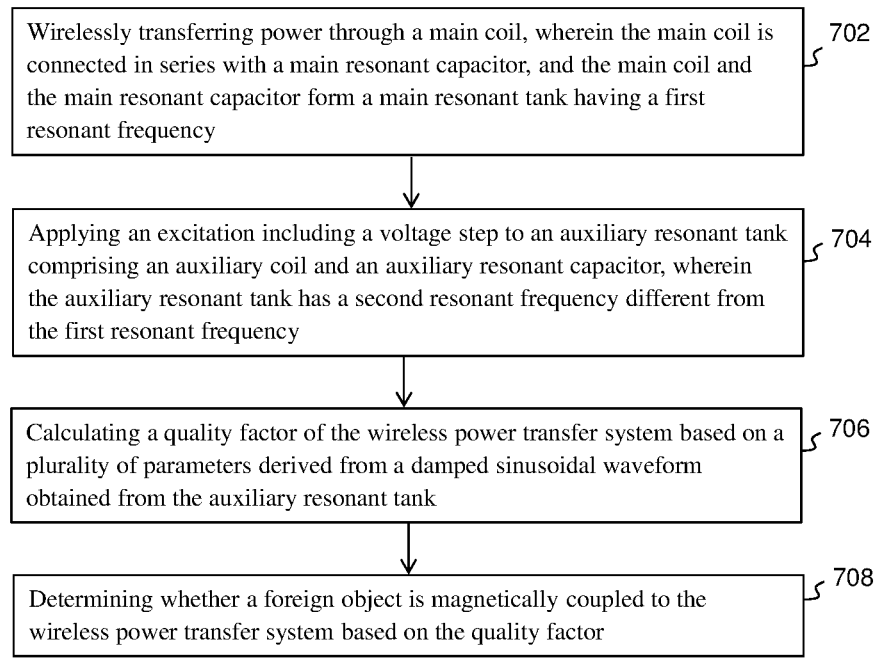
FIG. 7 illustrates a flow chart of using a quality factor of the wireless power transfer system to detect a foreign object in accordance with various embodiments of the present disclosure.

FIG. 7 illustrates a flow chart of using a quality factor of the wireless power transfer system to detect a foreign object in accordance with various embodiments of the present disclosure. This flowchart shown in FIG. 7 is merely an example, which should not unduly limit the scope of the claims. One of ordinary skill in the art would recognize many variations, alternatives, and modifications. For example, various steps illustrated in FIG. 7 may be added, removed, replaced, rearranged and repeated.

A wireless power transfer system (e.g., wireless power transfer system shown in FIG. 1) comprises a transmitter and a receiver. The transmitter comprises a full bridge, a resonant capacitor and a transmitter coil. The receiver comprises a receiver coil and a rectifier. The transmitter coil is magnetically coupled to the receiver coil. The wireless power transfer system may further comprise an auxiliary coil. In some embodiments, the auxiliary coil may be placed adjacent to the transmitter coil (e.g., the coil arrangement shown in FIG. 3). The transmitter coil is considered as a main coil. In alternative embodiments, the auxiliary coil may be placed adjacent to the receiver coil (e.g., the coil arrangement shown in FIG. 3). The receiver coil is considered as a main coil.

In some embodiments, the transmitter may be a charging pad. The receiver may be a mobile phone. In order to detect a foreign object, a quality factor of the wireless power transfer system is calculated based on the steps below.

At step 702, power is transferred through the main coil. The main coil is connected in series with a main resonant capacitor. The main coil and the main resonant capacitor form a main resonant tank having a first resonant frequency.

At step 704, an excitation including a voltage step is applied to the auxiliary resonant tank comprising the auxiliary coil and an auxiliary resonant capacitor. The auxiliary resonant tank has a second resonant frequency different from the first resonant frequency. The excitation is applied to the auxiliary resonant tank through two steps. In a first step, a bias voltage source is connected to the auxiliary resonant tank through turning on a first switch and turning off a second switch. A current flows from the bias voltage source to ground through the auxiliary resonant tank. In a second step, the bias voltage source is disconnected from the auxiliary resonant tank through turning off the first switch and turning on the second switch. The current flows in a conductive loop formed by the auxiliary resonant tank and the second switch. After turning off the first switch and turning on the second switch, the voltage across the auxiliary coil has a damped sinusoidal waveform (e.g., the damped sinusoidal waveform shown in FIG. 6).

At step 706, the quality factor of the wireless power transfer system is calculated based on a plurality of parameters (e.g., t1 and y1 shown in FIG. 6) derived from a damped sinusoidal waveform obtained from the auxiliary resonant tank. Alternatively, the quality factor of the wireless power transfer system may be calculated based on the RMS ratio method, the peak value detection method, and any suitable quality factor methods.

At step 708, a controller is configured to determine whether a foreign object is magnetically coupled to the wireless power transfer system based on the quality factor. In some embodiments, a reduction of the value of the quality factor may indicate a foreign object is magnetically coupled to the wireless power transfer system. The method shown in FIG. 7 can be implemented in the foreign object detection apparatus shown in FIG. 4.

In some embodiments, the foreign object detection method includes wirelessly transferring power through a main coil in a wireless power transfer system, wherein the main coil is connected in series with a main resonant capacitor, and the main coil and the main resonant capacitor form a main resonant tank having a first resonant frequency, during a process of wirelessly transferring power through the main coil, calculating a power loss in the wireless power transfer system, during the process of wirelessly transferring power through the main coil, applying an excitation including a voltage step to an auxiliary resonant tank comprising an auxiliary coil and an auxiliary resonant capacitor, wherein the auxiliary resonant tank has a second resonant frequency different from the first resonant frequency, calculating a quality factor of the wireless power transfer system based on a plurality of parameters derived from a damped sinusoidal waveform obtained from the auxiliary resonant tank, and determining whether a foreign object is magnetically coupled to the wireless power transfer system based on the quality factor and the power loss.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for comprising:
wirelessly transferring power through a main coil of a wireless power transfer system, wherein the main coil is connected in series with a main resonant capacitor, and the main coil and the main resonant capacitor form a main resonant tank having a first resonant frequency;
during a process of wirelessly transferring the power through the main coil, applying an excitation including a voltage step to an auxiliary resonant tank comprising an auxiliary coil and an auxiliary resonant capacitor, wherein the auxiliary resonant tank has a second resonant frequency different from the first resonant frequency, and wherein the auxiliary coil is used for detection of foreign objects;
during a process of wirelessly transferring the power through the main coil, calculating a quality factor of the wireless power transfer system based on a plurality of parameters derived from a damped sinusoidal waveform obtained from the auxiliary resonant tank, wherein a step of calculating the quality factor of the wireless power transfer system comprises:
comparing the damped sinusoidal waveform having a resonant attenuation envelope with a predetermined threshold voltage and detecting a last time instant at which a value of the damped sinusoidal waveform is equal to the predetermined threshold voltage, wherein the damped sinusoidal waveform is a voltage signal detected from the auxiliary coil;
determining a peak value of the damped sinusoidal waveform based on the last time instant, wherein a time instant corresponding to the peak value and the last time instant are in a same period of the damped sinusoidal waveform; and
calculating the quality factor based on a ratio of the voltage step to the peak value; and
determining whether a foreign object is magnetically coupled to the wireless power transfer system based on the quality factor.

2. The method of claim 1, further comprising:
determining whether the foreign object is magnetically coupled to the wireless power transfer system based on a reduction of a value of the quality factor.

3. The method of claim 2, further comprising:
calculating a power loss of the wireless power transfer system in the step of wirelessly transferring power through the main coil; and
determining whether the foreign object is magnetically coupled to the wireless power transfer system based on comparing the power loss with a predetermined power loss threshold.

4. The method of claim 3, wherein:
the quality factor and the power loss are taken in combination to determine whether the foreign object is magnetically coupled to the wireless power transfer system.

5. The method of claim 1, further comprising:
applying the excitation to the auxiliary resonant tank through a switch network, wherein the switch network comprises a first switch connected between a bias voltage source and a first input of the auxiliary resonant tank, and a second switch connected between the first input and a second input of the auxiliary resonant tank.

6. The method of claim 5, further comprising:
connecting the bias voltage source to the auxiliary resonant tank, wherein a current flows from the bias voltage source to ground through the auxiliary resonant tank and the first switch of the switch network; and
disconnecting the bias voltage source from the auxiliary resonant tank, wherein the current flows in a conductive loop comprising the auxiliary resonant tank and the second switch of the switch network.

7. The method of claim 1, wherein:
the main coil is a transmitter coil in the wireless power transfer system, and wherein the transmitter coil is configured to magnetically coupled to a receiver coil of the wireless power transfer system.

8. The method of claim 1, wherein:
the main coil is a receiver coil in the wireless power transfer system, and wherein the receiver coil is configured to magnetically coupled to a transmitter coil of the wireless power transfer system.

9. A method comprising:
wirelessly transferring power through a main coil in a wireless power transfer system, wherein the main coil is connected in series with a main resonant capacitor, and the main coil and the main resonant capacitor form a main resonant tank having a first resonant frequency;
during a process of wirelessly transferring power through the main coil, calculating a power loss in the wireless power transfer system; during the process of wirelessly transferring power through the main coil, applying an excitation including a voltage step to an auxiliary resonant tank comprising an auxiliary coil and an auxiliary resonant capacitor, wherein the auxiliary resonant tank has a second resonant frequency different from the first resonant frequency;
calculating a quality factor of the wireless power transfer system based on a plurality of parameters derived from a damped sinusoidal waveform obtained from the auxiliary resonant tank; and
determining whether a foreign object is magnetically coupled to the wireless power transfer system based on the quality factor wherein a step of calculating the quality factor of the wireless vower transfer system comprises:
detecting the damped sinusoidal waveform obtained from the auxiliary coil;
comparing the damned sinusoidal waveform with a predetermined threshold voltage:
detecting a last time instant at which a value of the damned sinusoidal waveform is equal to the predetermined threshold voltage:
determining a time instant corresponding to a peak value of the damped sinusoidal waveform based on the last time instant, wherein the time instant and the last time instant are in a same period of the damped sinusoidal waveform;
determining the peak value of the damned sinusoidal waveform based on the last time instant, the time instant and the predetermined threshold voltage:
calculating the quality factor based on the time instant and a ratio of a voltage level of the voltage step to the peak value; and
determining whether the foreign object is magnetically coupled to the wireless power transfer system based on a reduction of a value of the quality factor.

10. The method of claim 9, wherein:
the main coil is a transmitter coil in the wireless power transfer system, and wherein the transmitter coil is configured to be magnetically coupled to a receiver coil, and wherein the main coil and the auxiliary coil are placed in a transmitter of the wireless power transfer system.

11. The method of claim 9, wherein:
the main coil is a receiver coil in the wireless power transfer system, and wherein the receiver coil is configured to be magnetically coupled to a transmitter coil, and wherein the main coil and the auxiliary coil are placed in a receiver of the wireless power transfer system.

12. The method of claim 9, further comprising:
comparing the power loss with a predetermined power loss threshold; and
determining whether the foreign object is magnetically coupled to the wireless power transfer system based on an increase of the power loss.

13. An apparatus comprising:
a power conversion device coupled to a main resonant tank of a wireless power transfer system, wherein the main resonant tank comprises a main resonant capacitor and a main coil connected in series;
an excitation injection circuit coupled to an auxiliary resonant tank of the wireless power transfer system, wherein the auxiliary resonant tank comprises an auxiliary resonant capacitor and an auxiliary coil connected in series, wherein the auxiliary coil is magnetically coupled to the main coil; and
a controller coupled to the power conversion device and the excitation injection circuit, and configured to determine whether a foreign object is magnetically coupled to the wireless power transfer system based on a quality factor and a power loss of the wireless power transfer system, wherein the quality factor is calculated during a process of wirelessly transferring power through the main coil, wherein:
the controller is configured to apply an excitation to the auxiliary resonant capacitor and the auxiliary coil, detect a signal having a resonant attenuation envelope, compare the signal with a predetermined threshold voltage, and detect a last time instant at which a value of the signal is equal to the predetermined threshold voltage, and wherein the controller is configured to calculate the quality factor based on the last time instant.

14. The apparatus of claim 13, wherein:
the power conversion device is a full-bridge converter.

15. The apparatus of claim 13, wherein:
the excitation injection circuit comprises a first switch connected between a bias voltage source and a first input of the auxiliary resonant tank, and a second switch connected between the first input and a second input of the auxiliary resonant tank.

16. The apparatus of claim 15, wherein:
the bias voltage source is connected to the auxiliary resonant tank through turning on the first switch, and wherein after turning on the first switch, a current flows from the bias voltage source to ground through the auxiliary resonant tank; and
the bias voltage source is disconnected from the auxiliary resonant tank through turning off the first switch, wherein after turning off the first switch, the current flows in a conductive loop comprising the auxiliary resonant tank and the second switch.

17. The apparatus of claim 13, wherein:
the main resonant tank has a first resonant frequency;
the power conversion device is configured to operate at a switching frequency approximately equal to the first resonant frequency; and
the auxiliary resonant tank has a second resonant frequency, and wherein the second resonant frequency is higher than the first resonant frequency.

* * * * *